June 11, 1935.  S. B. WINN  2,004,803
SEMITRAILER
Filed July 27, 1932  3 Sheets-Sheet 1
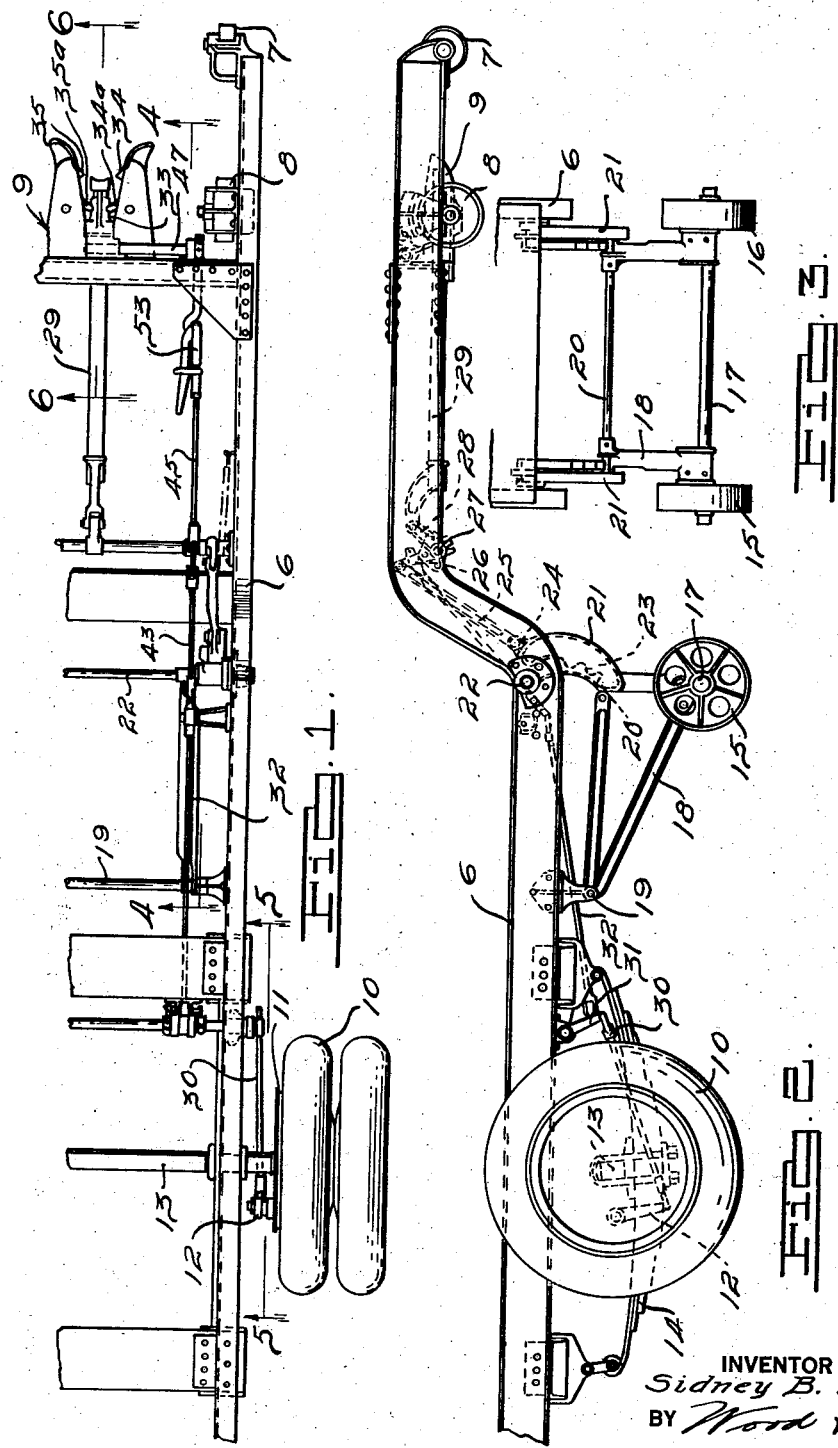
INVENTOR
Sidney B. Winn.
BY Wood & Wood,
ATTORNEYS

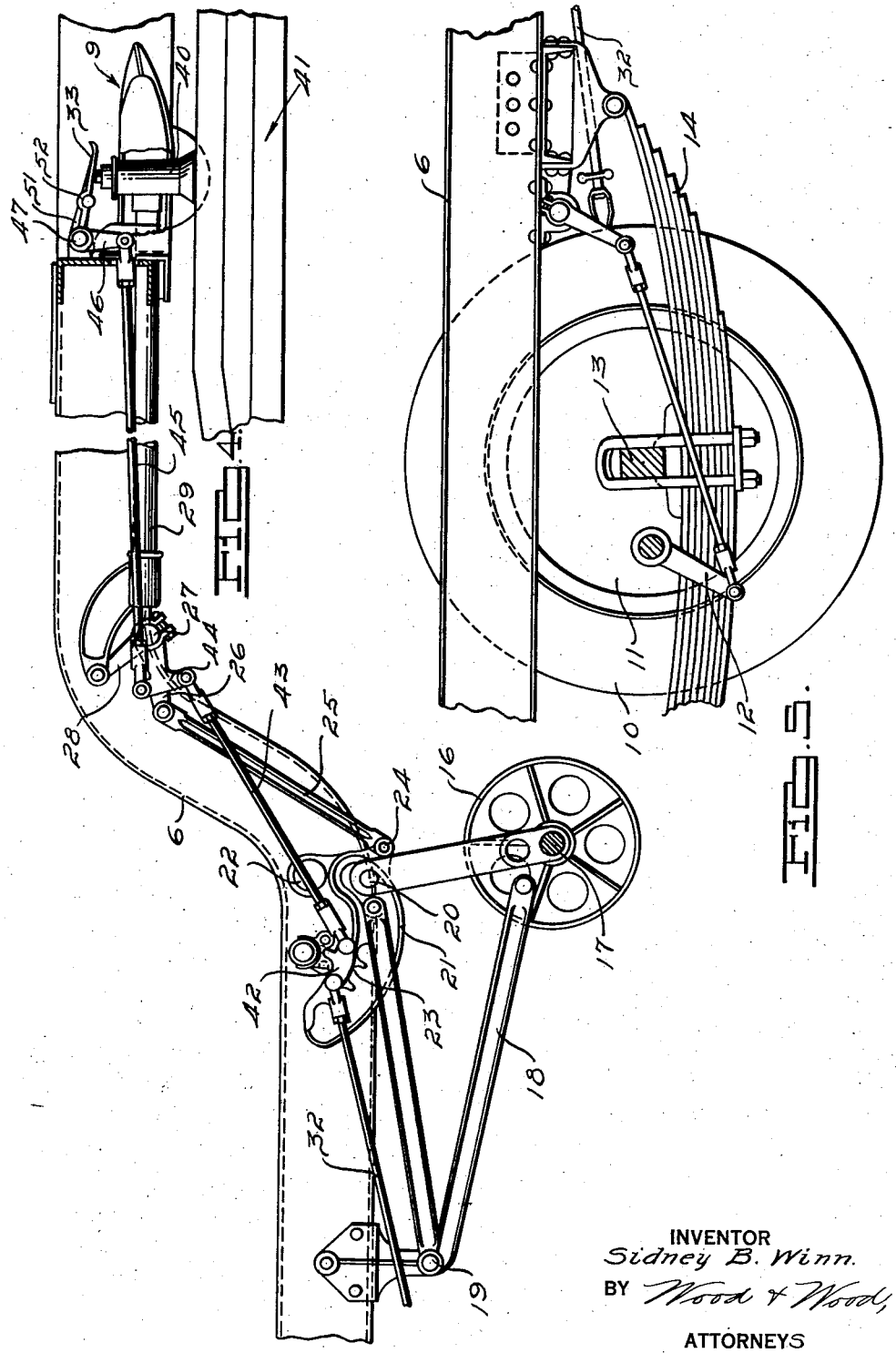

June 11, 1935.  S. B. WINN  2,004,803
SEMITRAILER
Filed July 27, 1932  3 Sheets-Sheet 3

INVENTOR
Sidney B. Winn.
BY Wood & Wood
ATTORNEYS

Patented June 11, 1935

2,004,803

UNITED STATES PATENT OFFICE 2,004,803

SEMITRAILER

Sidney B. Winn, Lapeer, Mich.

Application July 27, 1932, Serial No. 625,011

2 Claims. (Cl. 280—33.1)

My invention relates to semi-trailers, and particularly to means for raising the forward supporting leg of such vehicles.

In the adaptation of semi-trailers for use as commercial vehicles it frequently becomes necessary to provide a drop frame for special bodies such as oil tank bodies and the like. This is necessary in order to keep the center of gravity as low as possible and has made necessary the development of a semi-trailer in which the rear portion of the frame is lower than the forward portion. In order to provide for supporting the trailer when uncoupled from the tractor, it is a customary practice to provide a wheeled support which may be lowered to support the trailer when it is uncoupled from the tractor and which is elevated when the front of the trailer is supported by the tractor. In order to adapt such trailers to this particular work, it is necessary to keep the coupler on the trailer and the various operating mechanisms such as the mechanism for elevating the forward support entirely within a space having a height not to exceed the width of the trailer frame.

It is, therefore, an object of my present invention to provide a semi-trailer having a novel means for elevating its forward supports, said means being adapted to be contained in a space having a height no greater than the width of the trailer frame.

It is a further object of my present invention to provide a semi-trailer having novel brake operating and brake locking means actuated through the coupler and adapted to be contained and operated in a space of no greater height than the width of the trailer frame.

These, and various other objects, features of arrangement, construction and operation, are plainly shown and described and will be best understood by reference to the accompanying drawings wherein I have shown a preferred embodiment of my invention, in which Fig. 1 is a fragmentary top plan view of a semi-trailer embodying my invention;

Fig. 2 is a fragmentary view in side elevation of the trailer shown in Fig. 1;

Fig. 3 is a fragmentary front elevation showing the trailer support in its lowered position;

Fig. 4 is a sectional view taken on line 4—4, Figure 1, showing the support in the raised position, the forward end of the trailer being supported on the tractor vehicle, a portion of which is shown;

Fig. 5 is a sectional view taken on line 5—5, Figure 1, showing the brake linkage at the rear wheels of the trailer;

Similar reference numerals are used to refer to similar parts throughout the several views.

Figure 6:
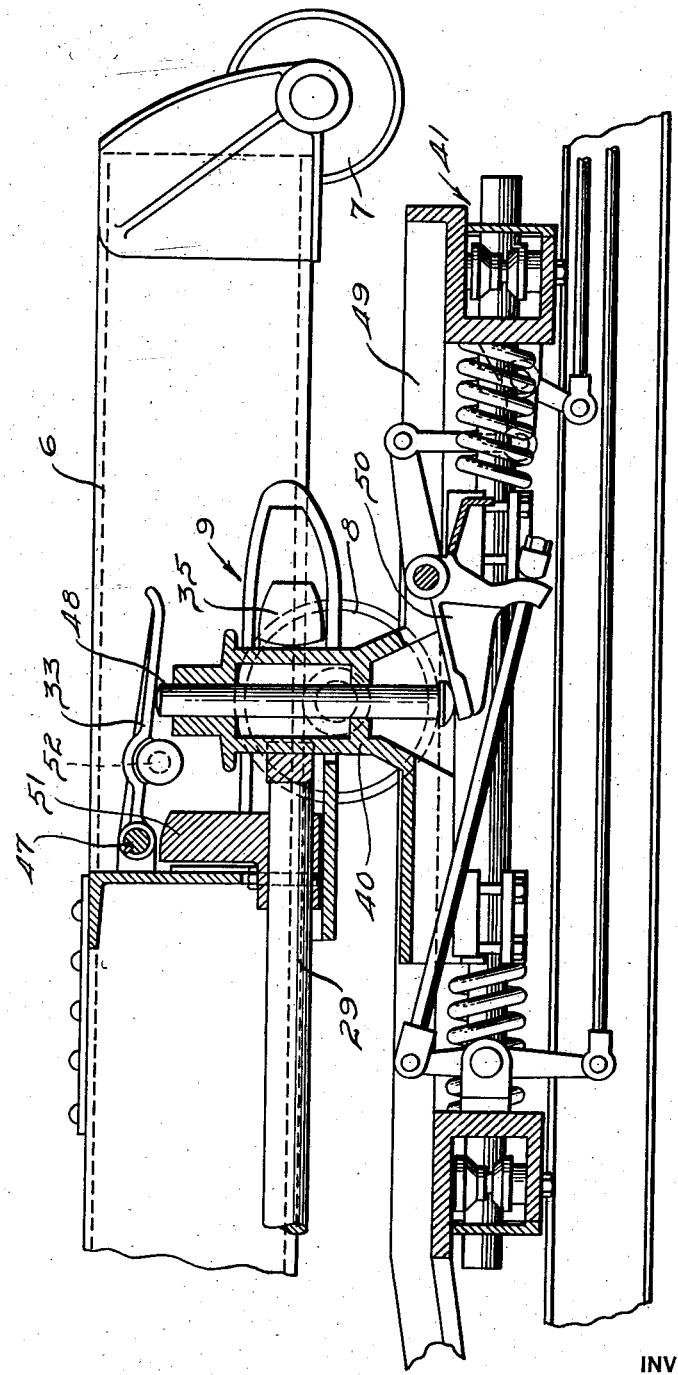
Fig. 6 is a sectional view taken on line 6—6, Figure 1, of the fifth wheel and coupler showing the trailer coupled to the tractor.

Referring more in detail to the drawings, 6 designates the frame work of a semi-trailer and comprises the side frame portions and cross frame members. At the forward end of the side frames are elevating wheels 7 and table wheels 8. While Fig. 1 shows approximately one-half of such a trailer, it is to be understood that similar elevating and table wheels, and a similar side frame, are provided for the portion of the trailer not shown.

Affixed to the front cross member of the frame 6 is the coupler 9 adapted for pivotally securing the trailer to the king pin 40 of the tractor fifth wheel 41 (Figs. 4 and 6). The number 10 designates one of the rear wheels of the semi-trailer carrying a brake drum 11. A brake operating arm 12 is provided at a point adjacent the said brake drum 11. The wheel 10 is secured to an axle 13, which in turn is connected with the frame of the trailer by means of springs 14.

In order to support the forward end of the trailer when it is uncoupled from the tractor, I provide a front trailer supporting member which consists of wheels 15 and 16 connected to an axle 17, held in a frame 18 pivotally connected to the frame of the trailer at a point 19. The forward portion of the frame 18 joins an axle 20, which is above and parallel to the axle 17. The axle 20 is journaled at each end in members 21, which are pivotally secured to the trailer frame at a point 22. A plurality of notches 23 are provided in each of the members 21. Each of the members 21 is provided with a portion 24 to which is pivotally connected a lever 25, which is connected to an arm 26, which is secured to the cross rod 27. Also secured to the cross rod 27 and adapted to cause it to rotate and to move the arm 26, is a second arm 28, to which is operatively connected the bar 29, which extends through the front cross member of the frame 6 and into the coupler 9. At the end of the rod 29 adjacent the coupler 8, a brake locking member 51 is secured.

The brake arm 12 is connected through the rod 30 to the brake equalizing arm 31, which is connected with the brake rod 32, the bell crank 42, the rod 43, the bell crank 44, the rod 45, the pivoted lever 46 and the rotatable shaft 47. A brake operating finger 33 is secured to the shaft 47 in such a manner that movement of the finger 33 causes rotation of the shaft and sets up movement in the whole train of brake operating mechanism.

The tractor fifth wheel 41, shown in Figs. 4 and 6, is shown and described in my Patent No. 1,660,946, and inasmuch as a semi-trailer embodying my invention may be used with other types of fifth wheel structures, a detailed description of this structure is not inserted in this application. The essential features of this structure for use with a semi-trailer embodying my invention are the king pin 40, in which is mounted a brake pin 48 for reciprocation therein, and a track 49 adapted to contact with the elevating wheels 7 or the table wheels 8 of the trailer vehicle. A bell crank 50 is provided for moving the brake pin 48. It is to be understood that the bell crank 50 may be operatively connected with brake operating means on the tractor vehicle in any desired manner.

The operation of a device embodying my invention is as follows:

When the tractor and trailer vehicles are coupled for operation as a unit, the king pin 40 on the tractor is engaged by the coupler jaws 34 and 35, as shown in Figs. 4 and 6. The end of the rod 29, projecting into the coupler head 9 between the heels of the jaws 34 and 35, contacts with the king pin 40 and is held in the position shown in these views by this contact. When the tractor and trailer are so coupled, the trailer support is held in its raised position as shown in Fig. 4, and the member 21 has been pivoted about the point 22 so as to occupy the position there shown.

The brake operating finger 33 contacts with the upper end of the brake operating pin 48 and is raised and lowered by movement of the brake operating pin 48 from the bell crank 50. The raising of the brake operating finger 33 causes a rotation of the shaft 47 and a shortening of the entire brake linkage exerting a braking force on the brake drums 11.

The coupler jaws 34 and 35 may be locked in any desired manner so as to prevent uncoupling of the vehicles except upon release of the locking means.

When it is desired to uncouple the vehicles, it is customary to apply the brakes on the trailer in the usual manner so that there will be no movement of the trailer during the uncoupling operation. The locking means on the coupler are then released and the tractor is moved away from the trailer. This movement of the tractor causes a separation of the tractor fifth wheel 41 from the coupler on the trailer and causes the king pin 40 to contact with the inner faces of the coupler jaws 34 and 35 and spread them apart. As the jaws 34 and 35 are spread apart, projections 34—a and 35—a on the heels of the jaws 34 and 35 engage in recesses in the sides of the head of the rod 29 and exert a forward pull on the head and on the rod 29. This forward pull, transmitted through the rod 29 to the lever 28, causes a pivoting of the shaft 27 in a clockwise direction. The movement of the shaft 27 is transmitted to the lever 26 and through it to the rod 25. The rod 25 being attached to the member 21, this movement causes the member 21 to swing downward and about the pivot point 22. As the member 21 thus moves, the axle 20 attached to the supporting mechanism moves in the track in the member 21. After movement of the member 21 is started, its swing downward is accelerated by the weight of the supporting member bearing on the axle 20, which moves in the track in the member 21, as above described.

Notches 23 in the member 21 serve to hold the axle 20 at any point where the wheels 15 and 16 touch a supporting medium such as the ground or the like, and are held against further downward movement. The weight of the trailer and its load then causes it to settle upon the support and bears upon the point 19 and the point 22. From both of these points the weight is transferred to the supporting wheels 15 and 16. The provision of a plurality of notches 23 in the member 21 makes it possible to support the trailer at various points and permits uncoupling of the vehicles even though the forward support cannot drop to its lowest point. When the support is in its lowest position, the parts appear as shown in Figs. 1, 2 and 3.

In order to hold the brakes on the trailer in the applied position, the cam 51 is pulled forward with the rod 29 and contacts with a roller 52 attached to the underside of the brake operating finger 33. This acts to raise the finger 33 if the operator of the trailer has neglected to apply the trailer brakes prior to the uncoupling, or to hold the finger 33 in the raised or brake applying position if the operator has applied the brakes, and the roller 52 remains in this position during the time that the vehicles are uncoupled.

If it is desired to move the trailer as a separate vehicle while the vehicles are uncoupled, a brake releasing mechanism 53 (Fig. 1) is provided. This mechanism allows slack to be put into the brake operating linkage back of the brake operating shaft 47, thus releasing the trailer brakes without disturbing the positions of the coupler jaws 34 and 35 or the leg elevating rod 24.

When it is desired to couple the vehicles, the tractor vehicle is backed into the trailer vehicle and the track 49 of the tractor fifth wheel 41 contacts with the elevating wheels 7 on the trailer. Further rearward movement permits contact of the table wheels 8 with the track 49. This centers the trailer and the coupler 9 relative to the king pin 40. Further rearward movement of the king pin 40 causes it to contact with the head of the rod 29 and push it rearwardly. This movement is transmitted through the projections 34—a and 35—a to the coupler jaws 34 and 35 and causes them to swing to the closed position. Further rearward movement of the tractor continues these movements until the rod 29 assumes the position shown in Fig. 4. At this time the member 51 is moved from under the roller 52 and the brakes are released and the coupler jaws 34 and 35 are closed and locked about the king pin 40.

The action of the elevating wheels 7 and the table wheels 8 with the track 49 is such that the weight of the trailer and its load is carried by these wheels and the track 49 and is removed from the supporting mechanism. This release of weight permits the axle 20 to drop from the notch 23 in which it had been held and contact with the curved track in the member 21. The rearward movement of the rod 29 during the coupling of the vehicles just described, is transmitted through the lever 28 to the shaft 27 and by it to the lever 26. The movement of the lever 26 is communicated to the rod 25 and causes it to push downwardly on the projection 24 on the member 21. This downwardly exerted force of the lever 26 causes the member 21 to pivot about the pivot point 22 and assume the position shown in Fig. 4. This movement of the member 21, due to its shape, causes a raising of the axle 20 and the attached supporting mechanism.

While I have illustrated and described one embodiment of my invention, it is apparent that various changes and modifications may be made without departing from the spirit of my invention, and I do not wish to be limited to the precise details of construction as herein set forth, but desire to avail myself of all changes within the scope of the appended claims.

Having thus described my invention, what I claim is new and desire to secure by Letters Patent of the United States is:

1. A supporting mechanism for the forward end of a rear-wheeled trailer, comprising, a swinging prop unit having its rear end pivotally connected to the trailer toward the forward end of the trailer, cam elements pivotally mounted on the trailer toward the forward end of the prop unit and engaging the forward swinging end of the prop unit, the cam elements having their actuating portions engaged with the prop unit for causing the prop unit to swing upwardly when the cam elements are moved rearwardly, and actuating means for said cam elements extending thereto from the forward end of the trailer.

2. A supporting mechanism for the forward end of a rear-wheeled trailer, comprising, a prop unit, said prop unit incorporating a generally vertically disposed framework carrying an axle and wheels at its lower end, and including spaced rearwardly extended bracing bars joined on a cross rod, the cross rod of said prop unit journalled in said trailer, cam elements pivotally mounted on the trailer toward the front end thereof and engaging the upper end of the vertically disposed framework of the prop unit, the cam elements having their actuating portions engaged with the prop unit for swinging the prop unit upwardly when the cam elements are swung rearwardly, and actuating means for said cam elements extending thereto from the forward end of the trailer.

SIDNEY B. WINN.